United States Patent
Eaton et al.

(10) Patent No.: US 7,032,369 B1
(45) Date of Patent: Apr. 25, 2006

(54) CROP THINNING APPARATUS AND METHOD

(75) Inventors: Wesley Eaton, Las Cruces, NM (US); Ryan Herbon, Las Cruces, NM (US); Vince Hernandez, Las Cruces, NM (US)

(73) Assignee: Arrowhead Center, Inc., Las Cruces, NM (US)

( * ) Notice: Subject to any disclaimer, the term of this patent is extended or adjusted under 35 U.S.C. 154(b) by 0 days.

(21) Appl. No.: 10/836,418

(22) Filed: Apr. 29, 2004

Related U.S. Application Data

(60) Provisional application No. 60/466,544, filed on Apr. 29, 2003, provisional application No. 60/484,452, filed on Jul. 1, 2003.

(51) Int. Cl.
*A01G 3/04* (2006.01)

(52) U.S. Cl. .............................. 56/233; 172/6
(58) Field of Classification Search .................. 56/233, 56/234, 235, 236; 172/1, 6, 26; 47/1.3, 47/1.43
See application file for complete search history.

(56) References Cited

U.S. PATENT DOCUMENTS

| | | | |
|---|---|---|---|
| 3,512,587 A | 5/1970 | Shader | |
| 3,525,403 A | 8/1970 | Cayton et al. | |
| 3,533,474 A | 10/1970 | Weeks | |
| 3,543,860 A | 12/1970 | Field et al. | |
| 3,590,925 A | 7/1971 | Troutner et al. | |
| 3,609,913 A * | 10/1971 | Rose | 47/1.43 |
| 3,654,998 A | 4/1972 | Shader | |
| 3,658,136 A | 4/1972 | Ernst | |
| 3,732,931 A | 5/1973 | Field et al. | |
| 3,776,316 A | 12/1973 | Eberhart | |
| 4,033,416 A | 7/1977 | Orthman | |
| 4,117,888 A | 10/1978 | Fuller et al. | |
| 4,291,709 A | 9/1981 | Weber et al. | |

(Continued)

OTHER PUBLICATIONS

Baugher, Tara A., et al., "Improved Methods of Mechanically Thinning Peaches at Full Bloom", *J. Amer. Soc. Hort. Sci.*, vol. 116, No. 5,, date (1991), 766-769.

(Continued)

*Primary Examiner*—Árpád Fábián Kovács
(74) *Attorney, Agent, or Firm*—Peacock Myers P.C.; Deborah A. Peacock; Philip D. Askenazy

(57) ABSTRACT

A method and apparatus for mechanically thinning crops, particularly those planted in rows. One or more crop thinning units are connected to the back of a tractor or other vehicle. Each of the units has the ability to sense plants and activate an arm which has a blade disposed thereon. An electronic control system enables data from several sensors to be evaluated such that plants may be selectively removed based on pre-established criteria. Sensors differentiate between weeds and plants, and maintain the cutting units above the crop rows.

35 Claims, 8 Drawing Sheets

U.S. PATENT DOCUMENTS

| | | | |
|---|---|---|---|
| RE31,023 E * | 9/1982 | Hall, III | 405/37 |
| 4,546,602 A | 10/1985 | Cosimati | |
| 4,821,807 A * | 4/1989 | Trumm | 172/6 |
| 4,936,810 A | 6/1990 | Strong et al. | |
| 5,210,999 A | 5/1993 | Cosimati | |
| 5,442,552 A | 8/1995 | Slaughter et al. | |
| 5,585,626 A * | 12/1996 | Beck et al. | 250/222.1 |
| 5,709,071 A | 1/1998 | Cosimati | |
| 5,837,997 A * | 11/1998 | Beck et al. | 250/227.11 |
| 6,182,770 B1 | 2/2001 | Picket et al. | |
| 2002/0024665 A1 * | 2/2002 | Masten | 356/328 |

OTHER PUBLICATIONS

John Deere Co., "Mechanical Sugar Beet Thinner machine", no date.

Klassen, Parry , "Radical Approach Cuts Pruning Costs", *Western Fruit Grower,* date (Jan. 1987),24-25.

Pool, Robert M., "Thin Grapes Mechanically", *Western Fruit Grower,* vol. 107, No. 10, date (1987), 17-19.

* cited by examiner

CROP THINNING APPARATUS AND METHOD

CROSS-REFERENCE TO RELATED APPLICATIONS

This application claims priority to and the benefit of U.S. Provisional Patent Application Ser. No. 60/466,544, entitled "Crop Thinning Apparatus and Method," to Hernandez et al., filed on Apr. 29, 2003, and U.S. Provisional Patent Application Ser. No. 60/484,452, entitled "Crop Thinning Apparatus and Method," to Eaton et al., filed on Jul. 1, 2003, and the specifications and drawings thereof are incorporated herein by reference.

BACKGROUND OF THE INVENTION

1. Field of the Invention (Technical Field)

The present invention relates to a method and apparatus for thinning crops. More particularly, the present invention relates to a method and apparatus for selectively thinning row type crops.

2. Description of Related Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

Today's agriculture has become a highly competitive industry. Historically, agricultural producers in other crops have converted from hand labor to mechanization in order to be more competitive. Increased technology and automation are thus needed to compete globally.

A common practice in crop production (e.g. chile production) is to over plant the desired population counts by as much as 1000% because potential weather damage and disease losses can reduce plant populations. Once the plants are established the stand must be thinned to a desired uniform spacing for maximum yields to be obtained. It is important to thin commercial crops (e.g. chile crops) so that plant growth is not inhibited by lack of space between plants. Growers deem optimum spacing to be about two to twelve inches between plants.

The cost of hand thinning is steadily increasing due to the declining availability of laborers and also due to increases in government labor regulation on migrant workers. The high cost of hand thinning increases the cost of crop production, making it harder for farmers to compete with foreign growers who have low labor costs.

Many vegetable/fruit crop industries thin plants mechanically. Mechanical thinning has been used in some crop industries, such as the sugar beet industry, to cut hand labor costs, thus increasing profitability.

Mechanical thinning has also been used to increase plum, peach, and nectarine production as well as cutting down on extra thinning costs by topping and hedging orchards during the first and second seasons of growth (Klassen, P. "Radical Approach Cuts Pruning Costs." *Western Fruit Grower* 107 (11) (1987), 24–25).

The main reason for mechanical thinning is labor cost reduction. According to Baugher, Elliot, and Leach (Baugher, T. A., Elliott, K. C., and Leach, D. W., "Improved Methods of Mechanically Thinning Peaches at Full Bloom." *Journal of the Society for Horticultural Science* 116(5) (1991), 766–769), during three years of research with the mechanical thinning of peaches, mechanical thinning not only increased the size of the fruit from 10% to 20%, but also afforded the grower the opportunity to decrease a major growing expense, namely hand thinning. The studies have shown that the hand-thinning requirement can be reduced by 40% to 100%. The cost of hand labor has gone up considerably in the last five years. In the United States, hand thinning costs approximately $70.00–$150.00/acre. With mechanization, labor costs can be reduced to about $8.00/acre.

In the grape industry, mechanical thinning is used to increase the production of Concord grapes. Two pruning cuts with a harvester that uses many long, thin rods that help to avoid excessive leaf thinning is driven at 1 mph (Pool, R. M. "Thin Grapes Mechanically." *Western Fruit Grower* 107(10) (1987), 17–19). The color in the fruit from the mechanically thinned trees is improved because the mechanically thinned trees allow more sunlight to penetrate the trees. By allowing the grower to control the crop size with mechanical thinning, the grower able to grow large crops, while still attaining the maturity level demanded by the buyer (Pool 1987).

Original mechanical thinners include the Blackwelder mechanical thinner and the Pickett Sugar Beet Manager. These thinners were designed to work independently of hydraulic solenoids or electric power. These machines are drug along the crop rows by a tractor while making contact with the ground. These machines do not use any hydraulics, nor are they electronically controlled.

Crop thinners currently available do not provide the ability to distinguish a weed from a plant which was intentionally planted. They also cannot distinguish between a healthy plant and a diseased or dead plant. For example, U.S. Pat. No. 3,512,587 to Shader, U.S. Pat. No. 3,654,998, to Shader, and U.S. Pat. No. 3,533,474, to Weeks, each disclose a plant thinning device which is not only incapable of distinguishing between healthy, unhealthy plants, and weeds, but also require two blades as well as two blade actuating assemblies for every crop row. Further, each of these devices relies on a sharp blade which is forced beneath the soil line where it remains while it is drug through the dirt, thus severing the roots of unwanted plants. Anyone who has ever attempted to maintain a sharp lawn mower blade can easily recognize the drawbacks in maintaining a sharp blade which is constantly being drug through the dirt.

U.S. Pat. No. 3,543,860, to Field, U.S. Pat. No. 3,732,931, to Field et al., and U.S. Pat. No. 3,535,403, to Cayton et al., each disclose a very complicated crop thinning device. Each device not only has several spring loaded assemblies, hydraulic, pneumatic, and electrical assemblies, but also requires two different pistons, and supporting hardware for each blade. Further, none of these devices selectively removes dead or dying crop plants, or selectively removes weeds.

U.S. Pat. No. 4,117,888, to Fuller et al. is directed toward a crop thinning device the size of a car. While the device is large and bulky and requires its own engine, the device cannot selectively remove weeds as well as unhealthy plants.

U.S. Pat. No. 3,590,925, to Troutner is directed toward a device that lacks the ability to recall anymore than one plant which has passed its sensor but not yet reached the blade. Because the device cannot remember whether individual plants, which reside between the sensor and the blade, should be kept or cut, exactly one or zero cuts can be made to crop row for distances equal to the distance between the sensor and the blade. Thus, to thin crops such that they are still relatively close to one another, the device requires a user to disassemble, modify, and reassemble it such that the sensor is very close to the blade and can thus thin crops to a relatively close spacing. Further, it is occasionally desirable to thin plants that are up to sixteen inches tall. Since plants which are uncut by the Troutner device must pass through the spoke-like blades, damage to the canopy of taller plants as they pass between the blades is highly likely. Further, since the blades are mounted on a hub-like mechanism, in order to effectively thin plants which are sixteen inches tall, and which must therefore pass therebelow, would require the device to be around forty inches tall.

U.S. Pat. No. 3,776,316 to Eberhart is directed only toward a control circuit for a crop thinning device, and not any type of device actually capable of thinning crops. It is unable to differentiate between healthy, and dead plants, or between weeds and crop plants. Further, the control circuit lacks the ability to store in memory whether individual plants should be cut or left which have passed the sensor but not yet reached the blade. Thus, any device which utilizes this control circuit will need to mount the sensor directly in front of the blade such that the crop can be thinned close together when necessary. Mounting the sensor directly in front of the blade, however, produces the problem that flying dirt and plant debris, created by the action of the blade, may unintentionally trip the sensor, thus giving false readings.

There is thus a present need for a method and apparatus which has the ability to distinguish between healthy and unhealthy plants, as well as weeds and crop plants. There is also a present need for a method and apparatus which stores into memory whether individual plants should be cut or kept which have passed the sensor, but not yet reached the blade.

BRIEF SUMMARY OF THE INVENTION

The present invention relates to a crop thinning system for cutting plants in at least one crop row. The preferred system of the invention comprises a blade, an arm communicable with the blade, a cylinder communicable with the arm, a sensor for detecting plants in the crop row and producing sensor readings, and an electrical control system, capable of storing information as to whether a plurality of plants residing between the sensor and the blade should be cut or uncut, and actuating the cylinder based on the sensor readings. The cylinder then communicates with the arm, the arm communicates with the blade, and the blade cuts the appropriate plants.

The system may use machine vision. The sensor may use a photoelectric sensor. The system may also have a screw jack for adjusting height, a sweeping blade for removing field debris, and/or a digital user interface which itself can be user programmable as to plant spacing.

The system can recognize unhealthy plants and weeds, as well as a centerline of the crop row. The electrical control system triggers the blade to thin plants based on plant height. The cylinder of the system can be a pneumatic cylinder, as well as a hydraulic cylinder. The system may have a shaft encoder as well as one or more coulter wheels.

The sensor can be vertically adjustable. The sensor can be placed from about 15 inches to about 30 inches in front of the blade.

The present invention also relates to a method for cutting plants in row crops. The preferred system described above, is used in the method of the present invention.

A sensor detects plants in the crop row and produces sensor readings. The electrical control system stores information as to whether or not plants residing between the sensor and the blade should be cut or uncut. The cylinder is activated based on the sensor readings and the apparatus cuts the appropriate plants.

The sensor reading can be via a machine vision sensor, a photo sensor, or by reading a switch. Values may be entered on a digital interface, and can be one or more plant spacing values.

Cutting height is adjusted, preferably by a screw jack. Field debris may be removed or set aside by a sweeping blade.

Unhealthy plants and/or weeds are preferably recognized, at which point the cylinder is electronically activated so that the blade cuts such plants. The cylinder is activated based on the sensor readings and the shaft encoder readings. The centerline of a crop row may also be recognized.

Plant height is preferably determined. The plant sensor may be vertically adjustable, e.g. disposed from about 15 inches to about 30 inches in front of the blade.

One, two, or more crop rows can be thinned at a time, based on the configuration of the system of the present invention.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention relates to a crop thinning apparatus and method. The present invention is particularly useful for thinning vegetables, including chile plants or any vegetable crop grown in a row-crop setting. The invention preferably uses sensors, proximity switches, encoders, PLC and other electronic components in conjunction with a mechanical system having cutting blades. The apparatus of the present invention is preferably pulled behind an agriculture-type tractor, to thin plants within a row-crop field.

While it is preferable that the present invention be pulled behind a tractor, anything having sufficient power to pull the present invention across a crop field can be used and will produce desirable results. Thus the term "tractor" as used throughout the specification and claims is intended to include any device or vehicle capable of pulling the present invention across a crop field.

While the preferred embodiment of the present invention most discussed includes a hydraulic motor connected to an air compressor which supplies pneumatic power to activate the blades of the apparatus, a number of other methods, systems, and devices will be readily apparent to those skilled in the art. These include but are not limited to: one or more hydraulic cylinders; one or more electromagnetic cylinders; one or more pneumatically powered cylinders wherein pneumatic energy is supplied via a gas powered compressor or a pressurized tank; one or more cylinders which utilize an explosive gas which is triggered by an electronic spark; and the like.

A few of the almost unlimited ways in which a plant can be detected by an electronic device are discussed herein. Those skilled in the art will readily recognize several other manners in which various sensors can be adapted to achieve the objectives of the present invention.

Figure 1:
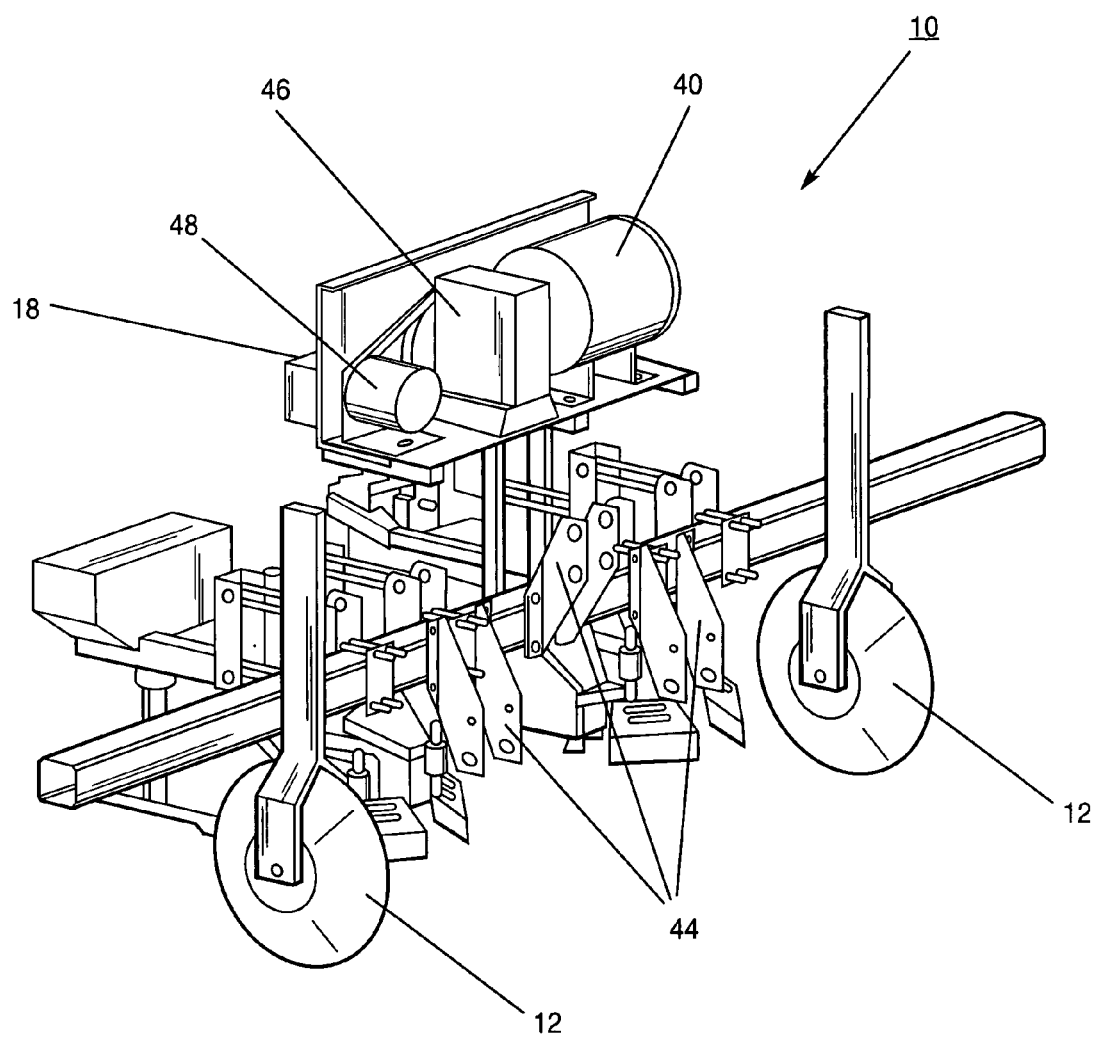
FIG. 1 is an isometric view of a preferred embodiment of the apparatus of the present invention configured to thin two rows simultaneously.
Figure 2:
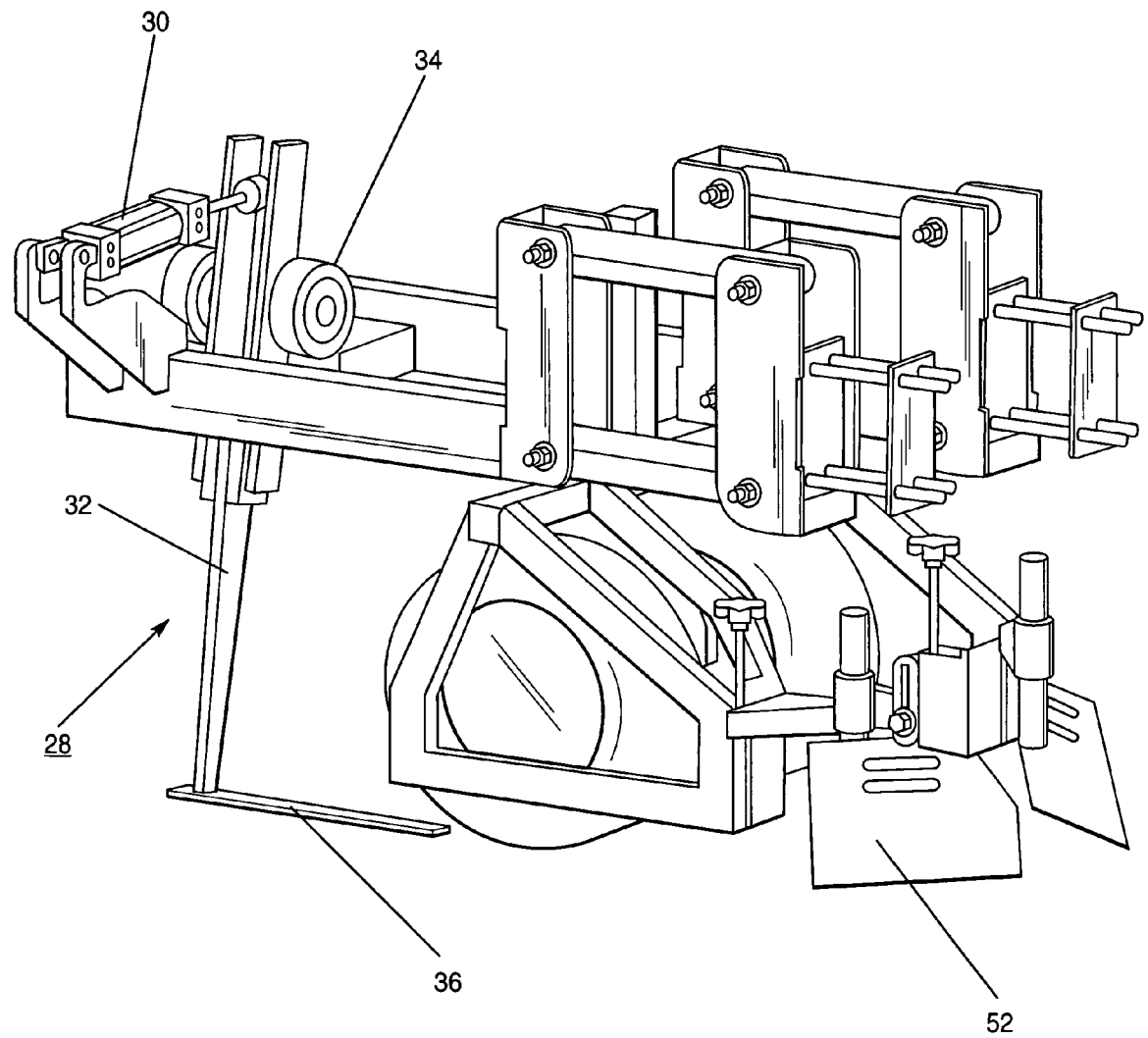
FIG. 2 is an isometric view of a preferred embodiment of the apparatus of the present invention configured to thin one row.
Figure 3:
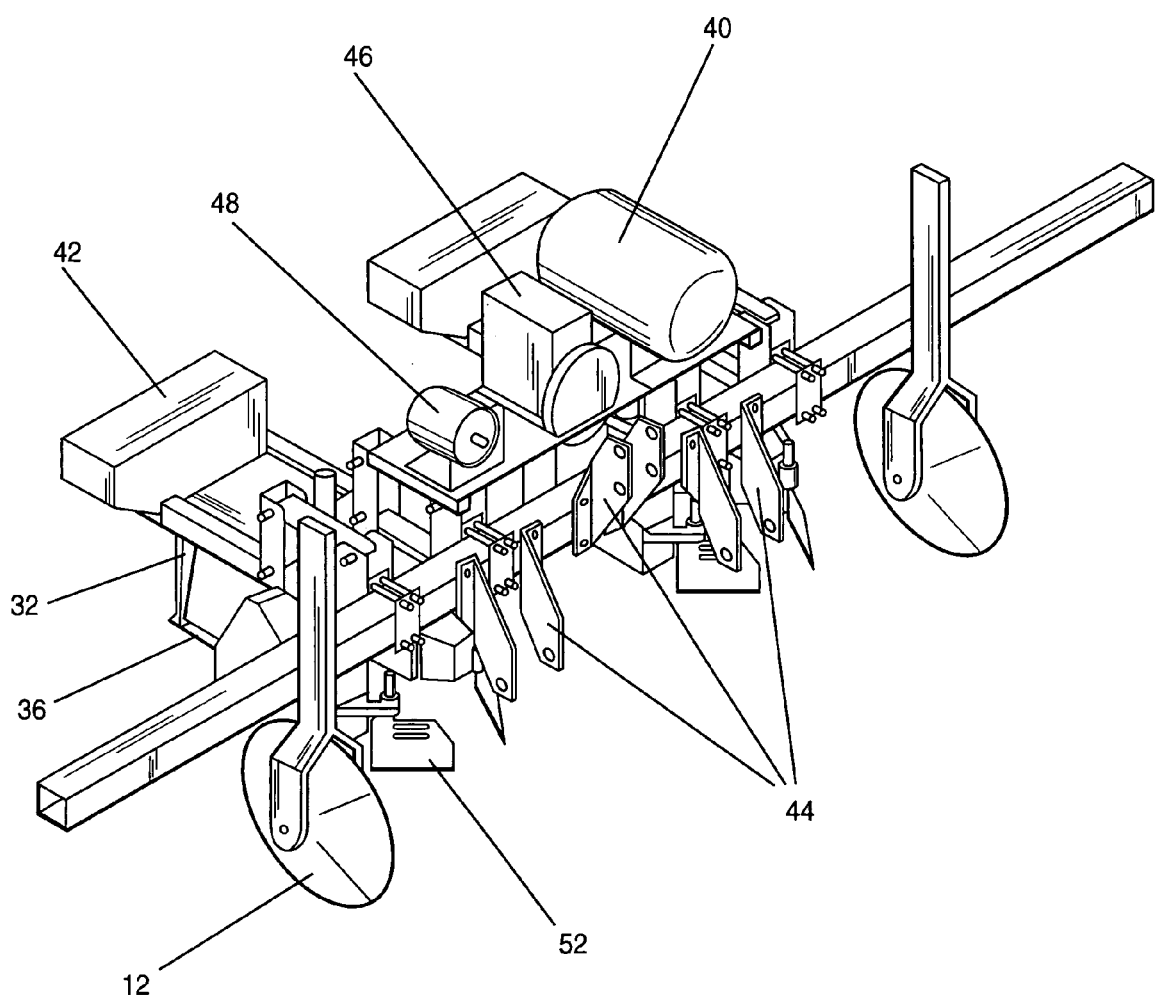
FIG. 3 is an isometric view showing the hydraulic motor, pneumatic pump, and air tank of the present invention.
Figure 4:
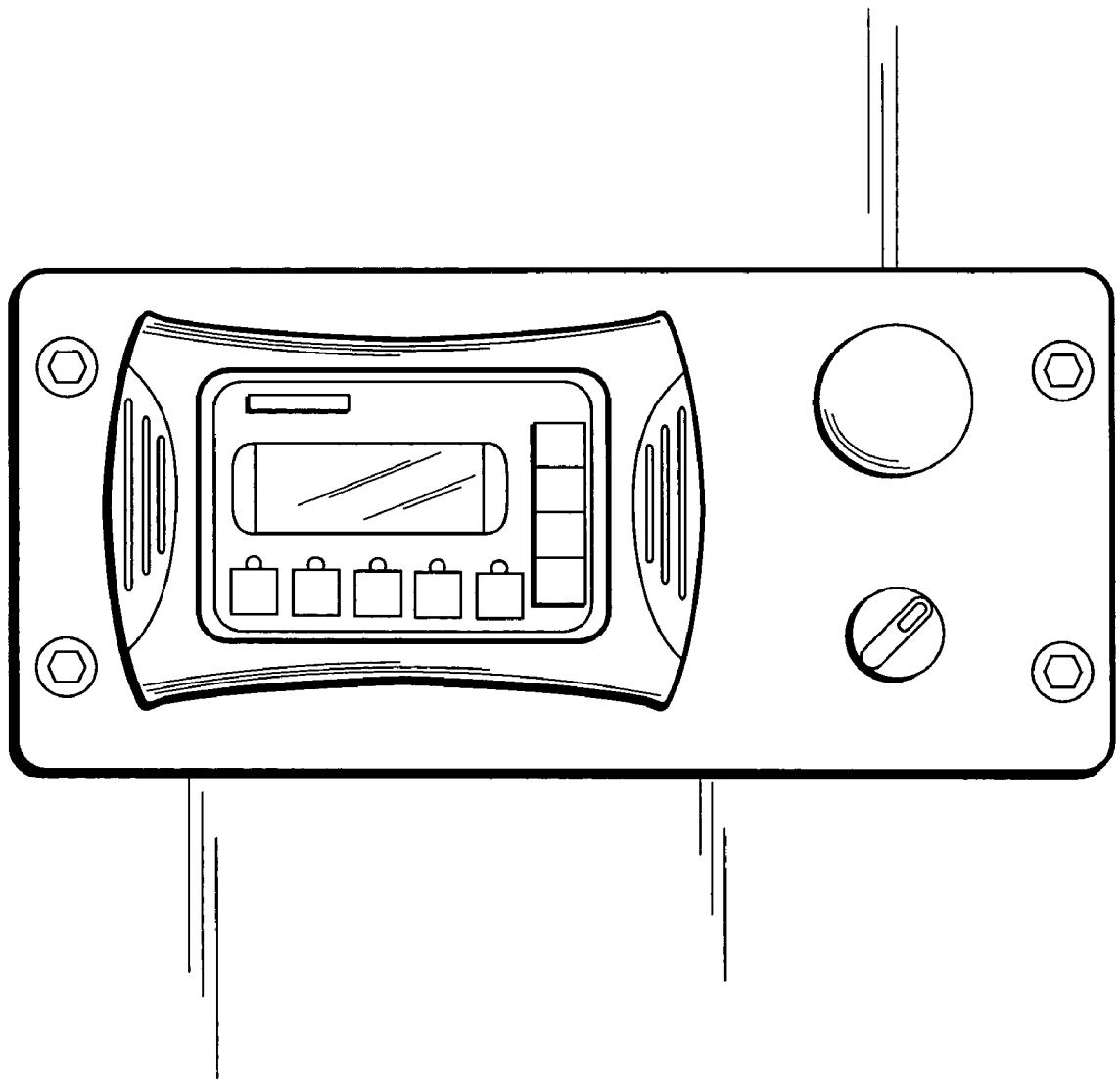
FIG. 4 is a photograph of the digital user interface of the present invention.
Figure 5:
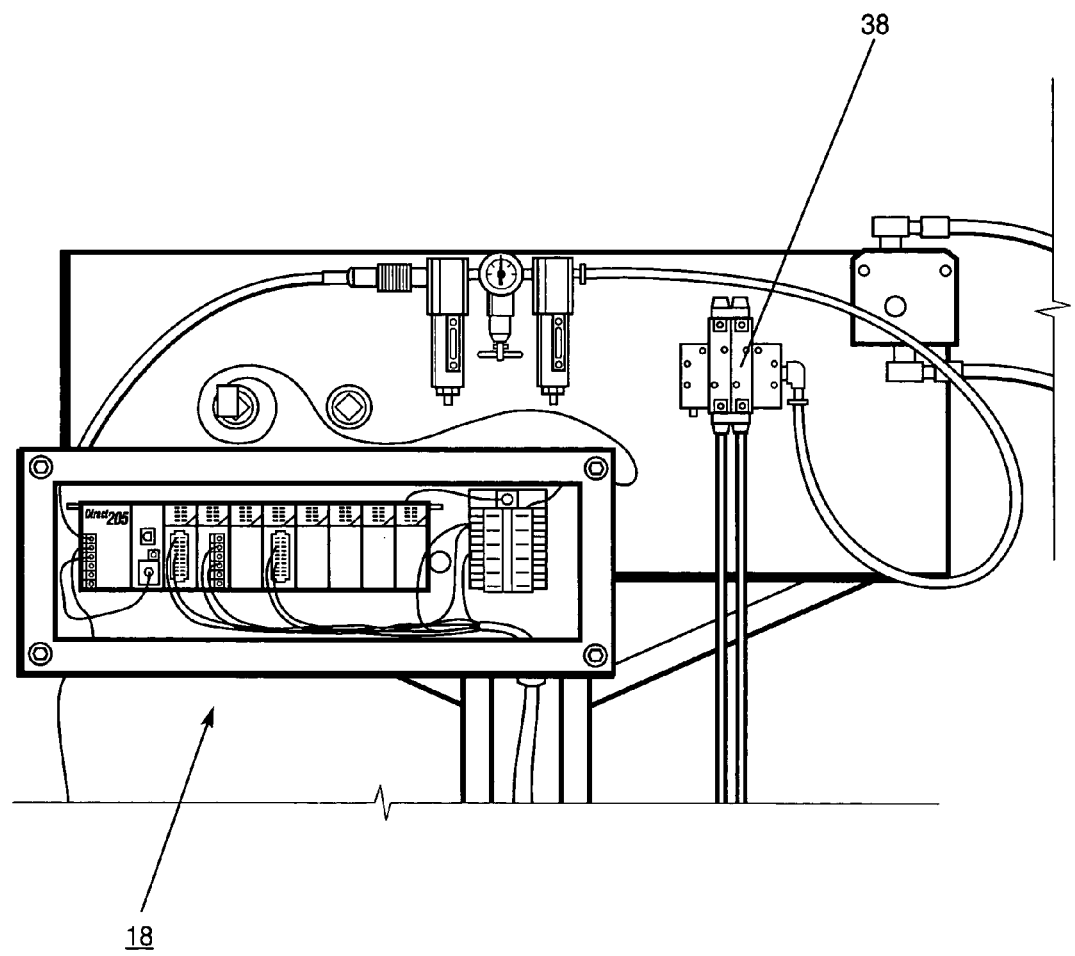
FIG. 5 is a photograph of the electronics control panel of the present invention.
Figure 6:
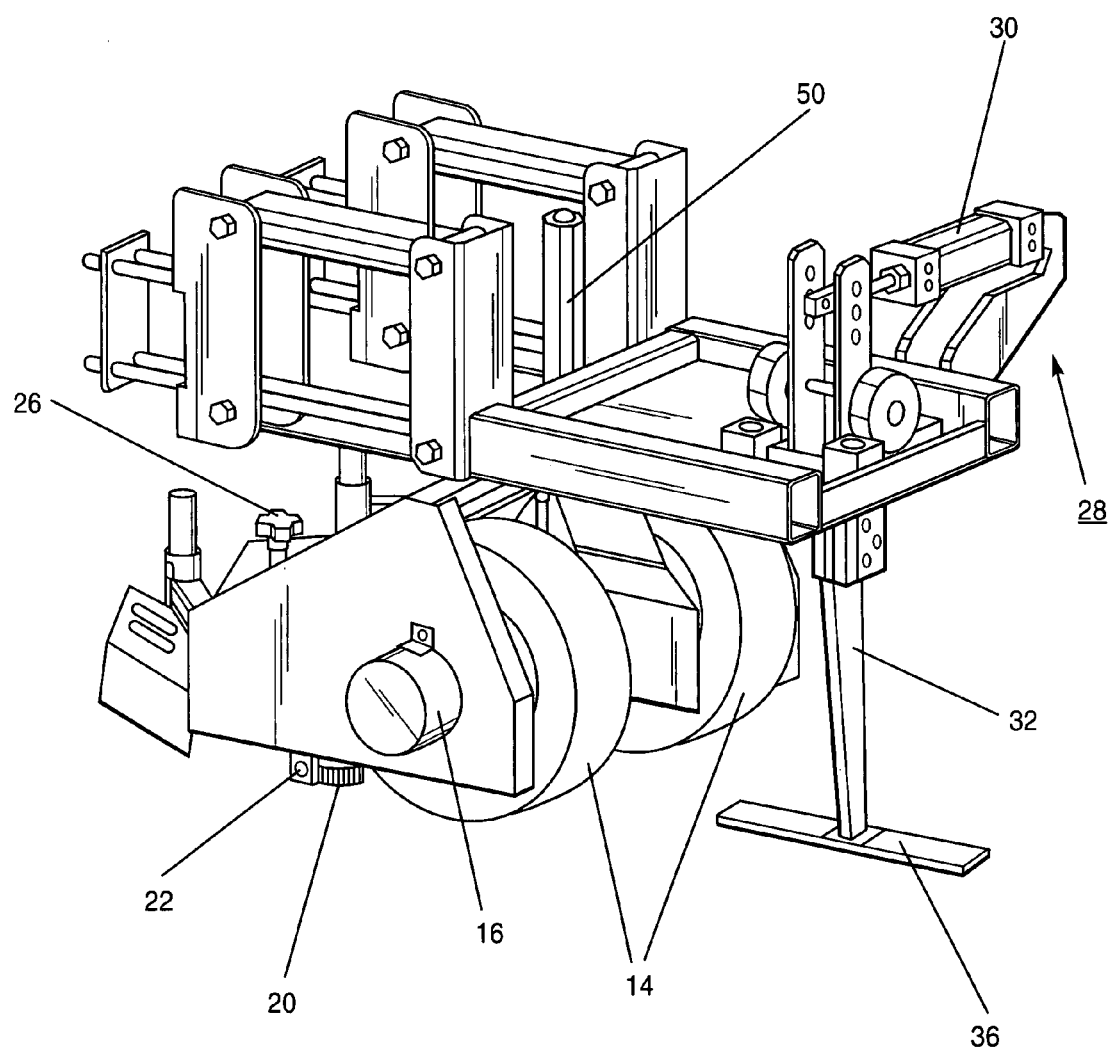
FIG. 6 is an isometric view of the present invention showing a preferred location for an encoder and plant sensor.

Referring now to the Figures, FIGS. 1 and 3 show a preferred embodiment of crop thinning apparatus 10 of the present invention which is capable of simultaneously thinning crops in two different rows. FIGS. 2 and 6 show a preferred embodiment of crop thinning apparatus of the present invention capable of thinning one row. FIGS. 4, 5, 7, and 8 show preferred components of the invention useful in the FIGS. 1 and 3, and 2 and 6 embodiments.

As shown in the Figures, apparatus 10 preferably has coulter wheels 12 which aid in maintaining the stability of apparatus 10 above crop rows. Coulter wheels 12 are preferably positioned such that they contact the ground in the track produced by the tractor tire. This ensures that coulter wheels 12 are contacting compacted ground, thus decreasing the likelihood that they will simply drag without rotating through loose soil. Gauge wheels 14 are preferably used to position each unit on the row, and to provide a consistent depth of the cutting blade.

Encoder 16 is preferably disposed on at least one of the gauge wheels 14 (see FIG. 6) or on at least one of coulter wheels 12. Distance can thus be determined by monitoring the output of encoder 16. Since encoder 16 measures distance, the speed of the apparatus of the present invention does not affect the measurements.

Crop thinning apparatus 10 also has electrical control system 18 (see FIG. 5) which reads the output from encoder 16 and sensor 20. Plant sensor 20 is preferably mounted on sensor mounting bracket 22. Sensor mounting bracket 22 is preferably vertically adjustable with screw type mechanism 24 (see FIG. 8). While an electric motor can easily be used to manipulate screw type mechanism 24, handle 26 is preferably used to manually manipulate screw type mechanism 24, thus adjusting the height of sensor 20 from the ground.

Data from plant sensor 20 is preferably combined with data from encoder 16 and processed by electrical control system 18 which, in turn, activates assembly 28 of the present invention. Assembly 28 of the present invention includes cylinder 30, arm 32, pivot point 34, and blade 36 (see FIGS. 2 and 6). Activating assembly 28 causes cylinder 30 to extend and or retract, thus causing arm 30 to partially rotate about pivot point 34. Since blade 36 is fixedly connected to a terminal portion of arm 30, partial rotation of arm 30 about pivot point 34 causes blade 36 to swing through a crop row. Assembly 28 is preferably activated by an electrical signal being sent from electrical control system 18 to solenoid 38, which in turn causes hydraulic fluid or compressed air to flow from air/hydraulic tank 40 to cylinder 30. While not essential, protective enclosure 42 preferably surrounds and protects cylinder 30, pivot point 34, and an upper portion of arm 32. Those skilled in the art will readily recognize that a plurality of cylinder, arm, and blade assemblies can be disposed behind, and operate independently of one another.

As best depicted in FIG. 6, although sensor 20 can be positioned directly in front of blade 36, sensor 20 is preferably positioned from about 15 inches to about 30 inches in front of blade 36. Positioning sensor 20 in this manner reduces the dust and debris, which are kicked up from the action of blade 36, from interacting with sensor 20.

Encoder 16 provides data which is used by electrical control system 18 to determine when to activate cylinder 30 such that the linear distance between sensor 20 and a center of blade 36 is compensated and apparatus 10 is capable of accurately cutting plants which are detected by sensor 20. If a blade having a different length is secured to arm 32, then the delay between a sensor reading and the activation of cylinder 30 should be adjusted to compensate for change in the distance between the sensor and a center of blade 36.

The present invention preferably has a digital user interface (see FIG. 4) which enables a user to program electrical control system 18. While those skilled in the art will readily recognize various attributes which may be user programmable, the electrical control system is preferably capable of being programmed such that crop spacing, height of plants to be cut, distance from a crop row centerline, and plant color can be user defined through the aid of the digital user interface. Since sensor 20 is preferably disposed from about 15 inches to about 30 inches in front of blade 36, several small plants in the crop row will be passed by sensor 20 before reaching the strike zone of blade 36. Thus, the digital user interface preferably allows for the control electronics to remember up to about 15 plants which have passed sensor 20 but not yet reached the strike zone of blade 36. With the ability to remember up to about 15 plants, apparatus 10 can selectively choose to remove or keep each of the plants. The digital user interface of the present invention is also preferably capable of allowing a user to determine the distance that is traveled before cylinder 30 is allowed to activate. Storing a distance value in a first electronic buffer preferably does this. A second electronic buffer is also preferably provided which enables a user to enter another distance delay value. This second buffer value is simply added to the first. Providing a second buffer value simplifies the setup of the present invention. This is because the second value is preferably used to store a value which is equal to about one-half the diameter of the plant top.

While any number of attachment assemblies can easily be devised and connected to crop thinning apparatus 10 by those skilled in the art, crop thinning apparatus 10 preferably has a three-point attachment assembly 44 for attachment to a tractor.

As show in FIG. 3, pneumatic energy provided by air compressor 46 is preferably stored in tank 40. Air compressor 46 is preferably powered by hydraulic motor 48, which is preferably supplied with a flow of pressurized hydraulic fluid by an external source such as a tractor. An alternative to this method is to use a hydraulic pump connected to the PTO of the tractor, to generate hydraulic pressure to power hydraulic cylinders. This can also be achieved by powering cylinders with hydraulic pressure generated by the tractor implement pump.

Electrical control system 18 (see FIG. 5) can use a microcontroller, Programmable Array Logic (PAL) or Gate Array Logic (GAL) chips, a microprocessor, or any other electronic device or devices or combinations thereof known to those skilled in the art, which are capable of determining when to activate arm 32 based on preset conditions and sensor input.

An electronic tracking apparatus can also be used in conjunction with the present invention, as is common in the art.

Crop thinning apparatus 10 is easy to adjust and operate. Crop thinning apparatus 10 is able to eliminate the hand labor costs that are driving vegetable producers out of business. The crop thinning apparatus is capable of thinning one row of crops (see FIG. 2), two rows of crops (see FIG. 1) or other multiples of rows of crops. By providing a first assembly 28 which is disposed slightly left a center line of a double crop row, and a second assembly 28 which is disposed slightly right of a center line of a double crop row, the present invention can thin crops which are planted double rows per each furrow.

The cost savings or benefit of utilizing the present invention can be easily seen with the following calculation. Assuming 300 acre per year usage and common agricultural machine costs, the estimated total cost to operate the crop thinner of the present invention, including amortized initial cost, repairs, operator and tractor, is approximately $30 per acre. Thus, if 20,000 acres of chile is thinned with the crop thinner of the present invention, a potential annual savings of $2,400,000 is possible.

The apparatus of the present invention uses an electronic sensing system to "see" each plant, thus allowing the elimination of plants that are closer than the correct spacing. Blade 36 is used to physically cut out the unwanted plants. The cutting mechanism is preferably hydraulic operated for simplicity in design and economy in construction. Crop thinning apparatus 10 is adjusted for desired plant spacing (e.g. from 2 to 12 inches or other spacing as needed). This is easily accomplished by fastening blades of different lengths to arm 33. Height adjustment mechanism 50 preferably enables the blade of the present invention to cut at various heights (e.g. up to 16-inch tall plants). While any number of mechanisms can be constructed which will provide a height adjustment, height adjustment is preferably achieved by providing a screw-jack above each of gauge wheels 14. To increase the cutting height for any particular blade, all a user must do is simply rotate the handle of the screw-jack in a clockwise manner.

Sweeping blades 52 are preferably provided in front of sensor 20. Sweeping blades 52 remove debris away from the crop row such that sensor 20 is not triggered by such debris.

The crop thinning apparatus of the present invention preferably has air cylinders, hydraulics, and/or electric actuators which actuate the cutting blade; sufficient ground clearance to permit tall plants (e.g. up to 16") to be thinned; an electrically and or mechanically adjustable blade stroke; one or more photoelectric sensors and or machine vision system for sensing plants; sweeping blades in front of the sensor to remove field debris; adjustable sensor height; sensor(s) positioned in a forward portion of the apparatus; an electronic control program; a cutting depth adjustment; continuous height adjustment which enables the apparatus to remain level; electronically or mechanically adjustable blade length, (e.g. from 2" to 12"); the ability to successfully operate at speeds up to 5 mph; adjustability for various distances of row spacing (e.g. from 20" to 50"); and the blades contact the plants below their cotyledons, thus preventing plant re-growth. For embodiments of the present invention having the ability to thin several rows at the same time, by using a plurality of thinning units, each thinning unit preferably operates independently of the others.

The linear distance between the sensor which is sensing a plant and the blade is preferably determined by summing the distance between the sensor and the leading tip of the blade plus half the blade length plus a variable representing the amount of material un-cut by the blade. Once a plant is sensed and loaded into memory, the program preferably has the ability to ignore all input from the sensor until the machine has traveled the length of the blade plus the distance of the preferred spacing plus an additional distance value stored in the electronic buffers.

Machine vision preferably analyzes the row from the top, thus enabling the present invention to make better decisions about the plants to be cut. For example, color, shape, or size differences can represent diseased plants or weeds. The microcontroller can thus cause the blade to remove diseased plants or weeds. One way this can be accomplished is by a program that creates a best fit line for the plants, thus identifying the center of the row. With the ability to recognize a center of a row, the machine vision preferably analyzes the picture perpendicular to the center line to check the pixel colors against the green hues which represent a plant. It also determines the width of the plant at that location and can infer the diameter and centroid of the plant. Green pixels with a centroid off of the centerline of the row crop thus represents weeds.

Machine vision can also discriminate between larger and smaller plants, thereby permitting the thinning of the small plants within the range to leave the larger plants, or permitting the thinning of another undesirable size range of plants. This allows selective thinning so the remaining plants fall within an acceptable range (minimum and maximum) of a desired value.

INDUSTRIAL APPLICABILITY

The invention is further illustrated by the following non-limiting examples.

EXAMPLE 1

Clipped Chile Re-growth Test

Figure 7:
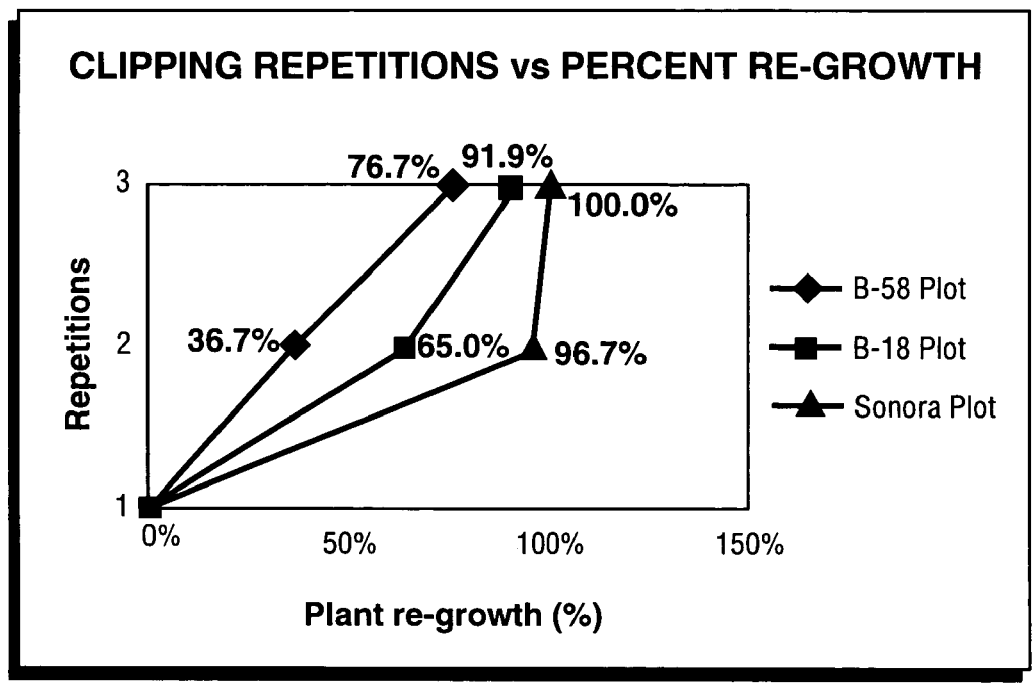
FIG. 7 is a graph of clipping repetitions versus percent re-growth.
Figure 8:
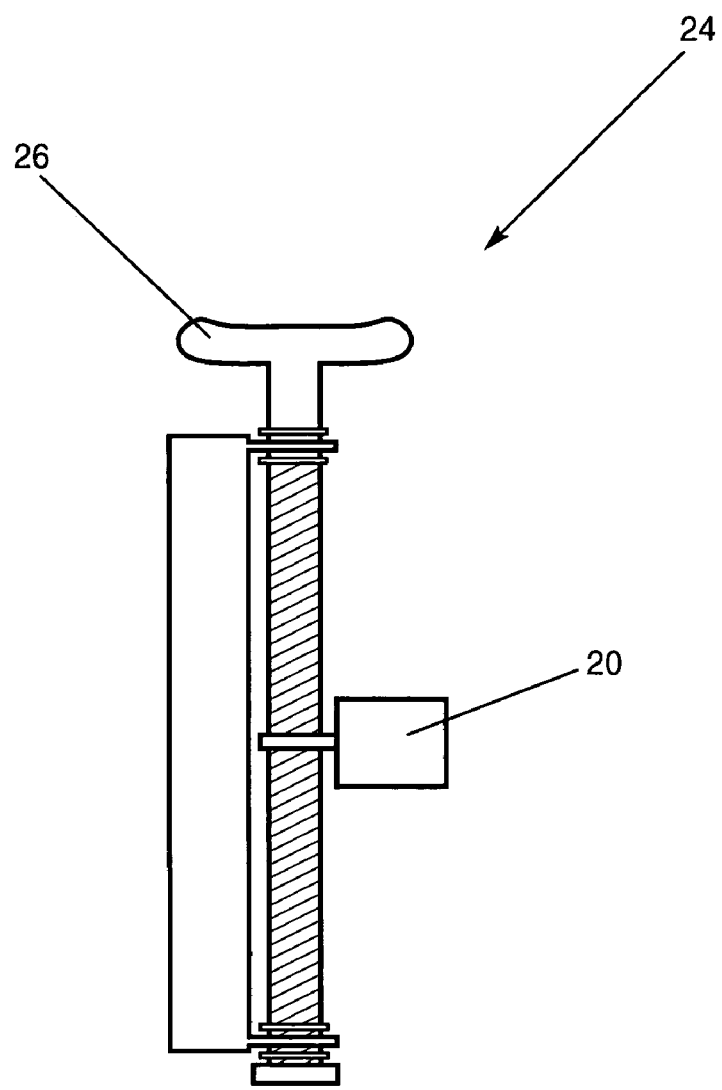
FIG. 8 is a drawing showing a side view of a screw-type sensor adjustment mechanism of the present invention.

A test was conducted at a research farm where three plots of different varieties of red chile peppers were clipped at different sections. The three different variety plots were labeled as B-58, B-18 and Sonora. Each of the three varieties were cut by hand to determine where the invention should cut the plants at three different times (repetitions 1, 2, and 3 with each repetition consisting of 10 chile plants). Repetition 1 was performed when the chile plants were cut below the cotyledons. (The cotyledons are the first seed leaves that break out of the soil. The next leaves to appear after these are the first true leaves, followed by the second true leaves.) Repetition 2 was performed wherein the chiles were cut below the first true leaves. Repetition 3 was performed wherein the chilies which were cut below their second true leaves. FIG. 7 shows the results of this experiment. As shown in FIG. 7, the least amount of re-growth occurred in repetition 1 where the plants were cut below their cotyledons. When the chile was clipped below the cotyledons, repetition 1, 0% of the plants of the three varieties grew back. Based on the results of this test, it was determined that it is important to have the mechanical thinner cut below the cotyledons so that the plants do not grow back later. When the chile was clipped below the first true and second true leaves, all three varieties showed re-growth with the cotyledons still intact.

EXAMPLE 2

A John Deere mechanical sugar beet thinner was modified as an intermediate step in developing a prototype crop thinner that would cut chile stems below the cotyledons. The Solid Works™ program was used to modify machine specifications so that it could adjust to rapid changes in plant height during early season growth. The program allowed one to accurately determine dimensions for new blade arms, blades, and sensor. Parts were cut from metal using the PlasmaCam™, a machine that works from Solid Works™ specifications. The sensor was a momentary switch which had a stainless steel plate connected to it. The plate on the new sensor was made larger than the sensor on the beet thinner to ensure that chile plants could make contact with it. The PlasmaCam™ cut the parts out of sheet metal.

In a first test, a modified John Deere thinner was used. The chile plants were about three to four inches tall. Two mechanical thinner units were attached to the tool bar. Before thinning, there were no spaces between the plants. Afterward, there were four-inch gaps between the plants.

The second test was conducted. There were four thinner units mounted on the tool bar. The chile plants were at five to six inches tall. To properly thin the plants, the four-unit mechanical thinner needed to be adjusted such that each unit was centered directly above its respective crop row. Four different tool sizes were required to adjust the mechanical thinner when needed.

The third test for the mechanical thinner was conducted. This time, a smaller, older model tractor was used to avoid problems with the amount of hydraulic pressure being pumped into the hydraulic motor on the thinner. The mechanical thinner adequately thinned the chile crop leaving a four to five inch gap between each plant. With the smaller tractor, there were no hydraulic mishaps or problems.

EXAMPLE 3

Based on the results of the four tests using the John Deere thinner, appropriate modifications were made in order to attempt to optimize the machine. With those modifications, there still existed some problems that played a major role in how well the thinner cut the chile plants as they grew taller. The John Deere thinner did not easily stay in line with the field rows, thus necessitating constant realignment so that the sensor could operate and actuate the blade arm properly.

The Solid Works™ computer program was used to develop the crop thinner apparatus of the present invention. The apparatus includes features similar to the John Deere, but with substantive modifications that improve cost effectiveness and make the apparatus simpler to operate and adjust. Electric actuators, rather than hydraulic solenoids, were to actuate the blade. The wheels were eliminated and screw jacks added to allow a wide range of height adjustment.

The plate of the sensor was converted to a photoelectric sensor instead of the wide, metal plate which contacted the canopy of the chile plants. A laser beam was made to shine across the crop row in a perpendicular fashion thereto. As those familiar with the setup of a photoelectric sensor are aware, every time the base of a chile plant broke the beam, a photo sensor, opposite the laser, detected the plant.

Modifying the most important parts of the mechanical thinner (the blade arms and the sensor) helped improve the thinning of chile plants. Adjusting the timing of the arm and the sensitivity of the sensor improved operation so that the mechanical thinner can effectively cut to the base of the plants. Modifying the blade arm enables the unit to be adjusted, such that it can thin plants up to a maximum height of eight inches without excessive bending of the plants or chopping plants that are not supposed to be cut.

The preceding examples can be repeated with similar success by substituting the generically or specifically described components and operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A crop thinning system for selectively cutting individual plants in at least one crop row comprising:
    a cutting blade;
    a sensor located a distance in front of said cutting blade for detecting at least one characteristic of individual plants in the crop row and producing at least one sensor reading for comparison with at least one predetermined characteristic value, said distance sufficient to prevent debris produced by said cutting blade from interacting with said sensor;
    an encoder for determining a position of said cutting blade; and
    an electrical control system capable of storing information as to whether each plant residing between said sensor and said cutting blade is a selected plant which should be cut and actuating said cutting blade based on said at least one sensor reading to cut the plant if it is a selected plant.

2. The system of claim 1 wherein said sensor comprises machine vision.

3. The system of claim 1 wherein said sensor comprises a photoelectric sensor.

4. The system of claim 1 further comprising a screw jack for adjusting height of said cutting blade.

5. The system of claim 1 further comprising a sweeping blade for removing field debris.

6. The system of claim 1 wherein said electrical control system comprises a digital user interface.

7. The system of claim 1 wherein said electrical control system is user programmable as to plant spacing.

8. The system of claim 1 wherein said electrical control system recognizes unhealthy plants.

9. The system of claim 1 wherein said electrical control system recognizes weeds.

10. The system of claim 1 wherein said electrical control system recognizes a centerline of the crop row.

11. The system of claim 1 wherein said electrical control system triggers said cutting blade to thin an individual plant based on plant height.

12. The system of claim 1 further comprising a cylinder.

13. The system of claim 1 wherein said cylinder comprises a hydraulic cylinder or a pneumatic cylinder.

14. The system of claim 1 further comprising a shaft encoder.

15. The system of claim 1 further comprising one or more coulter wheels.

16. The system of claim 1 wherein said sensor is vertically adjustable.

17. The system of claim 1 wherein said sensor is disposed from about 15 inches to about 30 inches in front of said cutting blade.

18. A method for selectively thinning crops, the method comprising the steps of:
   providing a crop thinning apparatus comprising a cutting blade and a sensor located a first distance in front of the blade sufficient to prevent debris produced by the blade from interacting with the sensor;
   detecting a characteristic of an individual plant with the sensor;
   comparing the detected characteristic of the individual plant to a predetermined characteristic value;
   determining if the individual plant should be cut; and
   cutting the individual plant with the cutting blade after a delay determined by comparing the first distance and a second distance traveled by the cutting blade subsequent to the detecting step.

19. The method of claim 18 wherein the step of detecting a characteristic of an individual plant comprises reading a sensor.

20. The method of claim 19 wherein reading a sensor comprises reading a machine vision sensor.

21. The method of claim 19 wherein reading a sensor comprises reading a photo sensor.

22. The method of claim 19 further comprising the step of vertically adjusting the sensor.

23. The method of claim 19 further comprising the step disposing the sensor from about 15 inches to about 30 inches in front of the cutting blade.

24. The method of claim 18 further comprising the step of adjusting a cutting height.

25. The method of claim 24 wherein the step of adjusting a cutting height comprises adjusting a screw jack.

26. The method of claim 18 further comprising the step of removing field debris with a sweeping blade.

27. The method of claim 18 further comprising the step of entering the predetermined characteristic value with a digital user interface.

28. The method of claim 18 wherein the comparing step comprises comparing the detected characteristic to a characteristic value for an unhealthy plant.

29. The method of claim 18 wherein the comparing step comprises comparing the detected characteristic to a characteristic value for a weed.

30. The method of claim 18 further comprising the step of recognizing a crop row centerline.

31. The method of claim 18 further comprising the step of determining plant height.

32. The method of claim 18 wherein the step of causing a blade to activate comprises electronically activating the cutting blade.

33. The method of claim 32 wherein electronically activating the cutting blade comprises electronically activating a cylinder communicably coupled to the cutting blade.

34. The method of claim 33 wherein the cylinder comprises a pneumatic cylinder.

35. The method of claim 18 further comprising the step of providing a shaft encoder and delaying activation of the blade based upon a reading from the shaft encoder.

* * * * *